(12) United States Patent
Pentico et al.

(10) Patent No.: US 7,212,347 B2
(45) Date of Patent: May 1, 2007

(54) REFLECTIVE ILLUMINATION SYSTEM

(75) Inventors: Clark Pentico, Simi Valley, CA (US);
Unsig Min, Westlake Village, CA (US);
Weimin Shi, Thousand Oaks, CA (US)

(73) Assignee: JDS Uniphase Corporation, Milipitas, CA (US)

( * ) Notice: Subject to any disclaimer, the term of this patent is extended or adjusted under 35 U.S.C. 154(b) by 139 days.

(21) Appl. No.: 11/006,089

(22) Filed: Dec. 7, 2004

(65) Prior Publication Data

US 2005/0122575 A1 Jun. 9, 2005

Related U.S. Application Data

(60) Provisional application No. 60/527,680, filed on Dec. 8, 2003.

(51) Int. Cl.
*G02B 27/10* (2006.01)
*G02B 17/00* (2006.01)

(52) U.S. Cl. ................. 359/625; 359/627; 359/726

(58) Field of Classification Search ............... 359/625, 359/626, 627, 619, 622, 621, 631, 629, 672–679, 359/720, 726, 853, 733–737; 362/609, 611, 362/623, 514, 296

See application file for complete search history.

(56) References Cited

U.S. PATENT DOCUMENTS

| | | | |
|---|---|---|---|
| 5,098,184 A | 3/1992 | van den Brandt et al. | 353/102 |
| 5,909,316 A | 6/1999 | Watanabe | 359/619 |
| 6,411,255 B2 * | 6/2002 | Roederer | 342/371 |
| 6,527,393 B1 * | 3/2003 | Ogawa | 353/38 |
| 6,604,436 B1 * | 8/2003 | Lewandowski et al. | 73/865.6 |

\* cited by examiner

*Primary Examiner*—Ricky Mack
*Assistant Examiner*—Brandi Thomas
(74) *Attorney, Agent, or Firm*—Allen, Dyer, Doppelt, Milbrath & Gilchrist, P.A.

(57) ABSTRACT

This invention discloses a reflective illumination system for supplying an optical radiation beam along a folded path for illuminating a planar object. The system includes a radiation source, and two facing parabolic dish-shaped arrays of parabolic or dished reflectors. Divergent light received from the light source incident on a first of the arrays is reflected as a larger collimated beam comprising plural separated sub-beams. Each of the reflectors or facets from the first array directs one of the sub-beams to a facet on the second array. The second array reflects the light it receives with a substantially uniform intensity onto a rectangular target location.

18 Claims, 9 Drawing Sheets

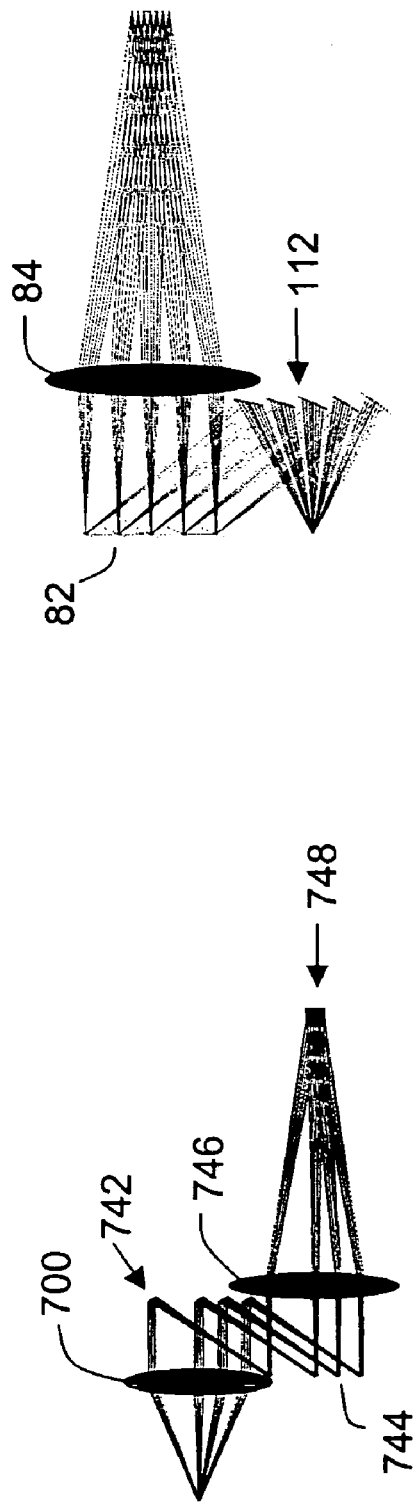
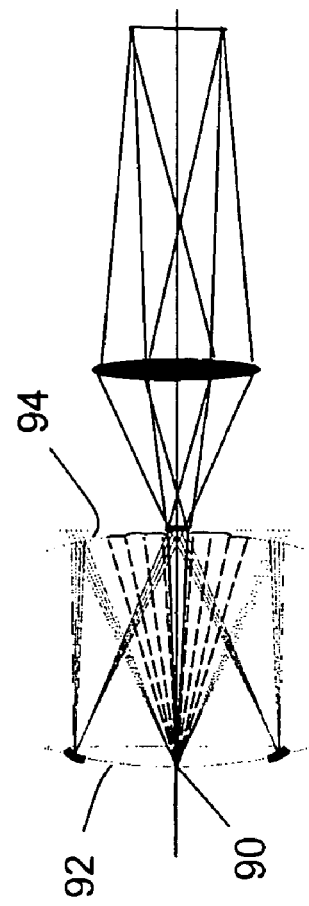
Figure 8
Figure 7
Figure 9

REFLECTIVE ILLUMINATION SYSTEM

CROSS-REFERENCE TO RELATED APPLICATIONS

This application claims priority of U.S. Provisional Patent Application No. 60/527,680 filed Dec. 8, 2003 entitled "Reflective Array" which is incorporated herein by reference for all purposes.

FIELD OF THE INVENTION

This invention relates to a reflective illumination system for supplying an optical radiation beam along a folded path for illuminating a planar object. The system includes a radiation source, and an array of reflectors. This invention also relates to an image projection apparatus comprising such an illumination system for illuminating at least one image display panel by means of which an image is generated.

BACKGROUND OF THE INVENTION

It is a goal of many prior art illumination systems used in projection display to provide a uniform light source having a substantially uniform intensity at and across a planar target location typically normal to the beam direction of the light source. In most instances this target location is rectangular in shape.

Various patents have addressed this problem by attempting to mix the light in light pipes or in free-space to later evenly spread the mixed light on a desired target homogeneously across it. For example, U.S. Pat. No. 5,098,184, incorporated herein by reference, issued Mar. 24, 1992 in the name of van den Brandt, et al. discloses a system wherein light directed from a light source captured by a parabolic reflector is redistributed such that the redistributed light arrives at its target with a more homogenous intensity distribution across the target region. As van den Brandt et al describe in their specification, "A parabolic reflector has of itself the advantage that it captures a large portion of the source radiation. However, the radiation beam formed by this reflector has an inhomogeneous distribution of the illumination intensity. It is true that a more homogeneous distribution can be obtained by arranging the radiation source outside the focal point of the parabola, but then the beam has a large angular aperture so that the projection lens system must have a large numerical aperture. The illumination intensity distribution can be made more homogeneous by using the lens plates in an illumination system with a parabolic reflector." Prior art FIG. 1 illustrates a system shown in the van den Brandt et al. patent, wherein two arrays of lenses are arranged in series such that the first array separates a diverging incoming beam into plural sub beams, and wherein the second array in series with a lens mixes light received from the first array for later focusing onto a target plane. Although this system appears to function adequately, there is a need for a much more compact structure having fewer components and which is less costly to manufacture.

U.S. Pat. No. 5,909,316, incorporated herein by reference, issued Jun. 1, 1999 in the name of Watanabe is in many respects similar to the system of van den Brandt, however Watanabe utilizes a transmissive curved lens element with a lenslet array to mix or homogenize incoming light. The curved lens array conveniently both converges and separates a received single beam of light into a plurality of converging beams. This is in some respects an advance over van den Brandt's system. Notwithstanding, Watanabe's system, arranged in a transmissive configuration is complex and requires lenses.

It is an object of this invention to provide an element that can both capture light from a light source and reflect the captured light into a plurality of sub-beams for further processing in an imaging system.

It is a further object of this invention to provide a compact, folded, light diffuser having at least one array of mirrors for folding beams of light to be mixed, thereby providing a mixing of incoming light making the intensity more uniform over a desired target surface.

It also an object of this invention to provide a very inexpensive and compact light system for homogenizing received light and for imaging the homogenized light more uniformly across a rectangular image plane.

SUMMARY OF THE INVENTION

In accordance with an aspect of this invention an optical illumination system for mixing light and providing mixed light to a target location is provided, comprising: a light source; and, a first concave reflective lens disposed to receive light from the light source formed from a two-dimensional array of smaller concave reflective lenses disposed in a dish-like configuration such that the first concave lens serves to focus or collimate divergent light incident thereon received from the radiation source, wherein the two-dimensional array of smaller concave reflective lenses are arranged to provide sub-beams from the light incident thereon received from the radiation source, wherein the first concave reflective lens assists in directing the incident beam toward the target location, wherein the concavity of each of the smaller lenses is substantially greater, that is, having a smaller radius of curvature than the concavity of the first reflective lens.

In accordance with another aspect of this invention, an optical illumination system for mixing light and providing mixed light to a target location is provided, comprising: a light source; and, a first fly's eye array of reflecting elements for receiving incident light in the form of a beam of light from the light source and for reflecting and focusing the received light as a plurality of focused sub-beams;

reflective means for receiving the focused beams and for imaging the focused beams toward the target location so that the beams overlap upon the target location.

In another aspect of the invention, there is provided an optical illumination system for mixing light and providing mixed light to a target location is provided, comprising: a light source; and, a first array of curved reflectors for receiving incident light and for reflecting and focusing the received light as a plurality of focused sub-beams;

reflective means optically coupled with the first array of curved reflectors, wherein one of the first array and the reflective means receive light from the light source and provide the light to the other of the reflective means and the first array for providing to the target location.

BRIEF DESCRIPTION OF THE DRAWINGS

Exemplary embodiments of the invention will now be described in accordance with the drawings, in which:

FIG. 7 is a diagram of a less preferred embodiment of a folded illumination system utilizing flat mirror arrays with lenses.

FIG. 8 is a diagram of a less preferred hybrid embodiment of a folded illumination system utilizing a flat mirror arrays and a lenses in combination with a curved array in accordance with this invention.

FIG. 9 is a diagram of an embodiment of this invention similar to that of FIG. 2, where the light source is behind the second array and wherein the second array has an opening to allow light from the light source to pass through.

DETAILED DESCRIPTION

Figure 1:
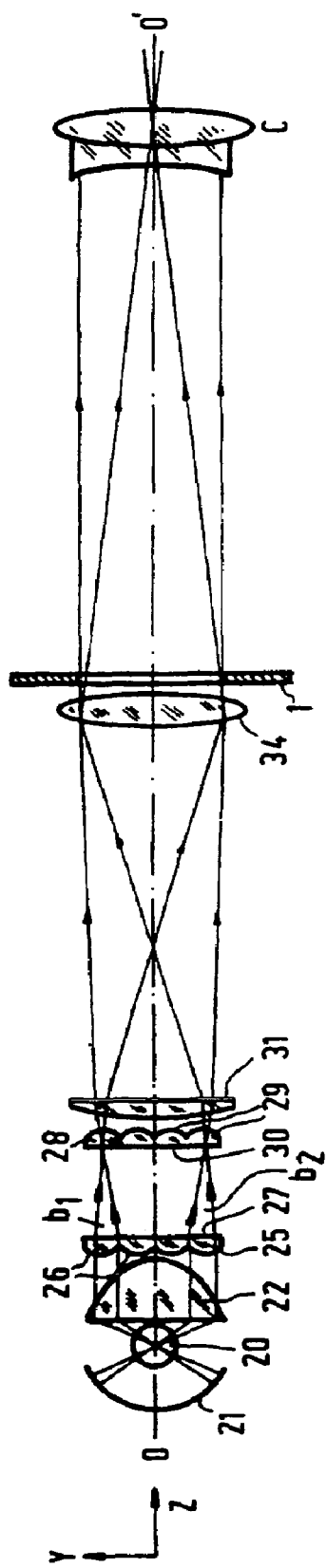
FIG. 1 is a prior art transmissive light diffuser shown and described in U.S. Pat. No. 5,098,184.

Referring now to prior art FIG. 1, an illumination system is shown comprising a lamp 20 which emits light in the direction of the display panel 1 as well as in the rearward direction (at the left in FIG. 1). A spherical reflector 21 receiving the rearwardly emitted light and forming an image of this lamp is arranged at the rear side of the lamp. In FIG. 1 the lamp image formed by the reflector 21 coincides with this lamp. It has been assumed that the lamp is transparent to its own light. This will often not be the case in practice. In that case it is ensured that the lamp image is situated beside the lamp. The light emitted by the lamp and its image are received by a condenser lens system 22 which concentrates this light to a parallel beam, in other words it images the lamp to infinity. The parallel beam is incident on a first lens plate 25. The side of this plate facing the source is provided with a matrix of lenses 26 and the other side 27 is preferably flat. Each of these lenses 26 images the source 20 on an associated lens 29 of a second lens plate 28. The source-facing side 30 of this plate is flat, while the side remote from the source supports a matrix of lenses 29. The number of rows and columns of lenses of the plate 28 corresponds to the number of the lenses of the plate 25. To image the radiation source on the different lenses 29 by means of the corresponding lenses 26, a different portion of the beam incident on the plate 25 is used each time. Each lens 29 ensures that a radiation spot formed on the corresponding lens 26 is imaged on the display panel 1. A lens 31 ensuring that all re-images are superimposed on one another in the plane of the display panel is arranged behind the second lens plate 28. This results in the illumination intensity distribution in this plane having the desired uniformity, the degree of uniformity being determined by the number of lenses of the plates 25 and 28.

Figure 2:
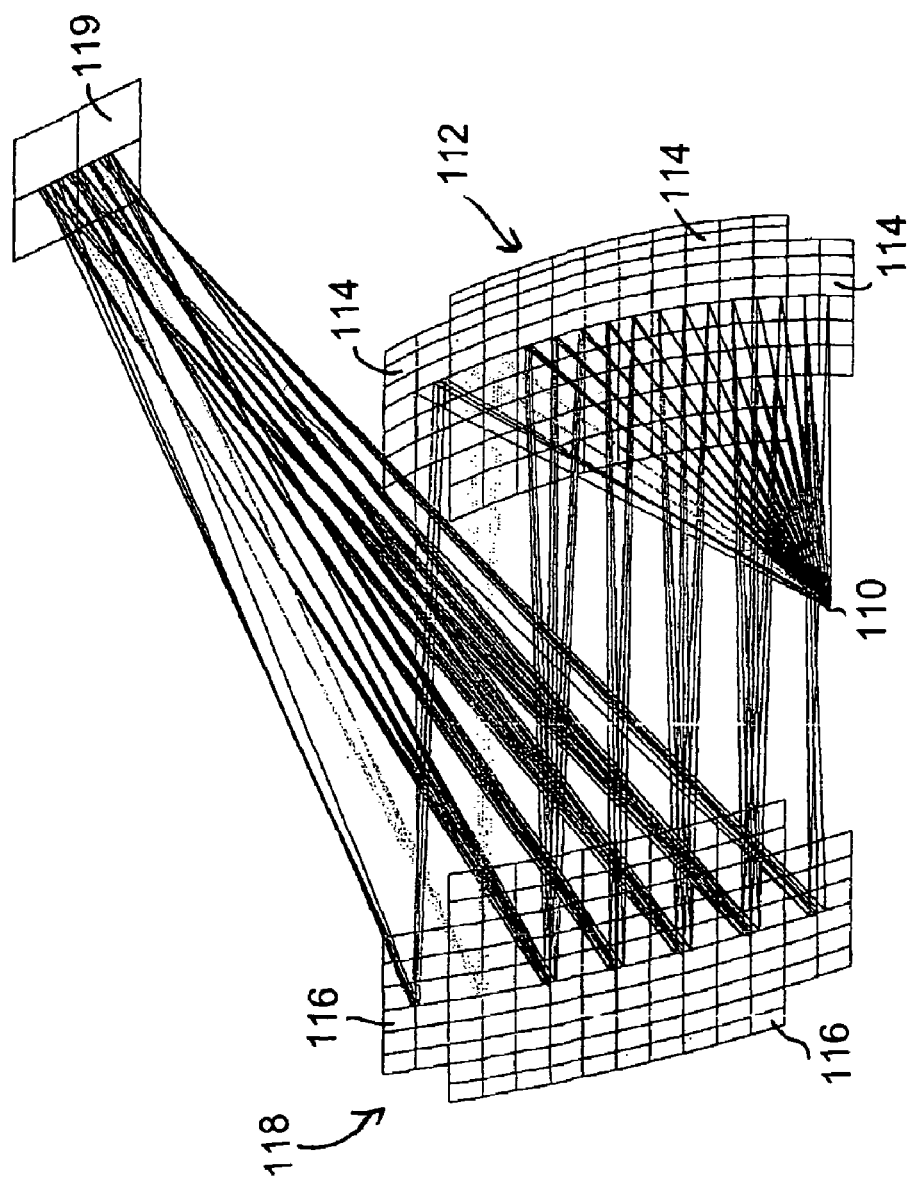
FIG. 2 is a diagram of a two array illumination system in accordance with an embodiment of this invention.

Referring now to FIG. 2, a 3-D view of a compact illumination system in accordance with an embodiment of this invention is shown, having fewer elements than the prior art system shown in FIG. 1, for performing essentially the same function; that of homogenizing a light source such that it impinges upon a square or rectangular target with a substantially uniform intensity. For convenience and ease of understanding the invention, FIG. 2 represents an instance wherein illumination is generated from a point source. Subsequent figures illustrated hereafter show a more accurate representation of an extended multi-wavelength light source. The target may be an imager or microdisplay 119, and by extension, a viewing screen in projection display applications. A lightsource 110 provides a beam to a first reflective fly's eye array 112 of small reflective dished or concave elements 114 in the form of reflective concave rectangular lenses or rectangular reflective facets arranged themselves to have their centers follow a 3-dimensional curved surface or parabola. The rectangular facets 114 each have an elliptical surface profile are adjacent or contiguous with one another without a space there between. The array of facets 112 serves to receive divergent light from the light source and to reflect the received beam as a plurality of sub-beams which together formats substantially collimated larger beam, wherein the number of sub-beams within the larger beam corresponds to the number of dish-like reflective facets 114. The overall curvature of the parabolic dish formed by the composite array of facets 114 serves to substantially collimate the diverging beam received from the light source; in effect this structure 112 performs the function of a separate fish eye array and that of a collimating lens as is shown in the prior art of FIG. 1. The sub-beams formed by the facets 114 each terminate on different rectangular reflective element or facet 116 which together form reflective means in the form of a second array 118 of reflective elements 116 sized and shaped to reflect light onto and to cover substantially most of the imager or microdisplay 119 at the target location. The second reflector array of rectangular facets or elements 116 faces the array 112 for receiving the sub-beams therefrom.

Each of the reflective rectangular elements 116 are concave, similar to the elements or facets 114, however the radius of curvature of the second array 118, and the radius of curvature of the individual facets 116, may be different than that of the first array 112 and its facets 114 to correctly image the light onto the rectangular image plane. Simulation software programs can be used to optimize the size and shape of the arrays. In this embodiment the mixing of the light or mixing of the separate beams incident upon the second array 118 occurs between the array 118 and the display panel such that the beams substantially and ideally completely overlap one another when they are directed onto the display panel 119. In addition to the structure shown in FIG. 2, a color wheel or other filtering means can be disposed in the path between the light source and the first array 112 to provide a required color or wavelength of light, as required, by pre-filtering the light before it reaches the target location. A preferred location for the color wheel is where the beam is shown to be substantially focused in FIG. 4 between the reflector 400 and the first array 412.

Figure 3:
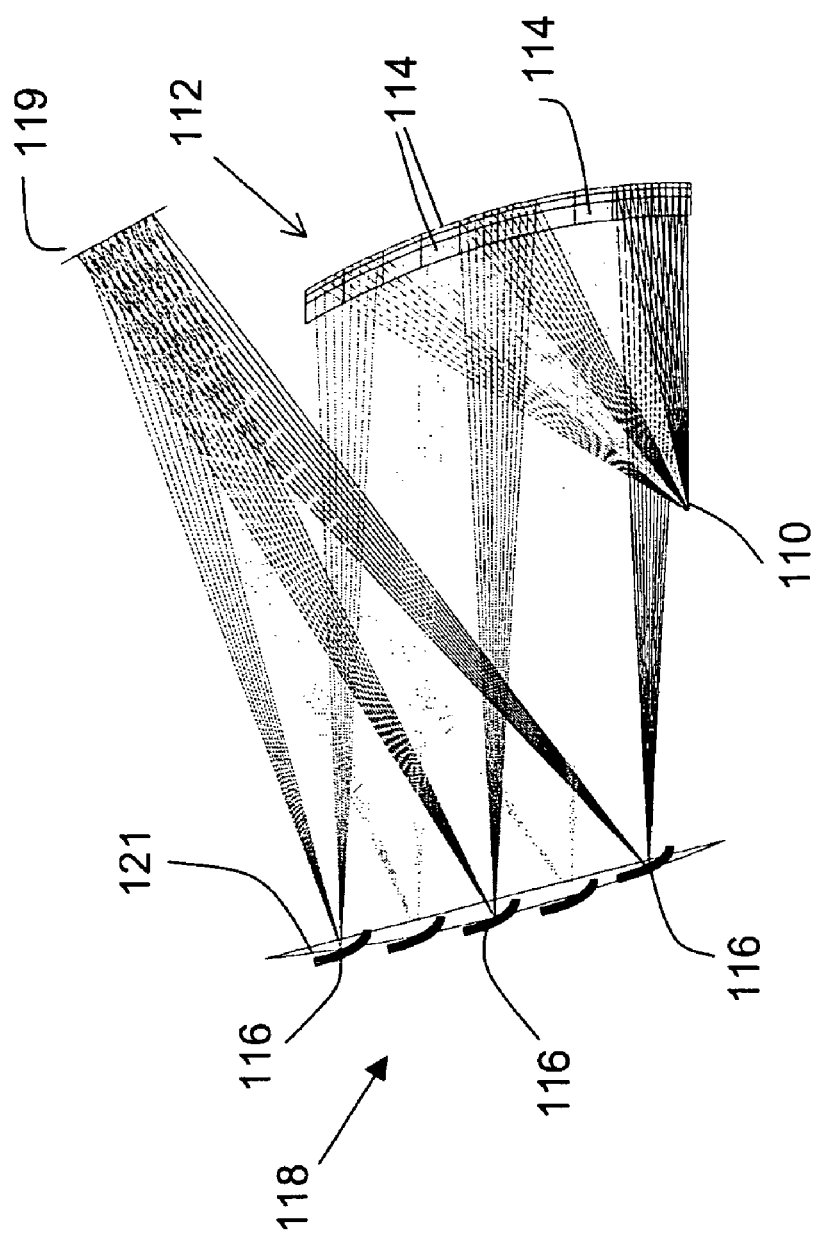
FIG. 3 is a diagram of the system shown in FIG. 2 wherein one of the arrays is shown in greater detail wherein dished facets are shown having their centers lying on a parabola.

FIG. 3 is a three-dimensional representation of a reflective light homogenizer in accordance with this invention. It should be noted however, that the first array 112 shown does not illustrate the difference in radius of curvature present in the individual rectangular reflectors, with that of the larger parabola defined by the totality of elements 114. The second array 118 however is shown more clearly to illustrate the individual facets 116 with their centers disposed along a parabola 121. The parabola may be an actual structure or may be a template or construct along which the facet centers lie in a fixed position. The facets of the first array are similarly configured. In contrast with the prior art embodiment, using reflective elements or facets instead of a plurality of transmissive lenses lessens or obviates chromatic dispersion typically introduced by transmissive lenses. It can also be seen that the number of components required in this embodiment is dramatically reduced compared to the aforementioned prior art device shown in FIG. 1. This also reduces the manufacturing cost and simplifies construction.

Figure 4A:
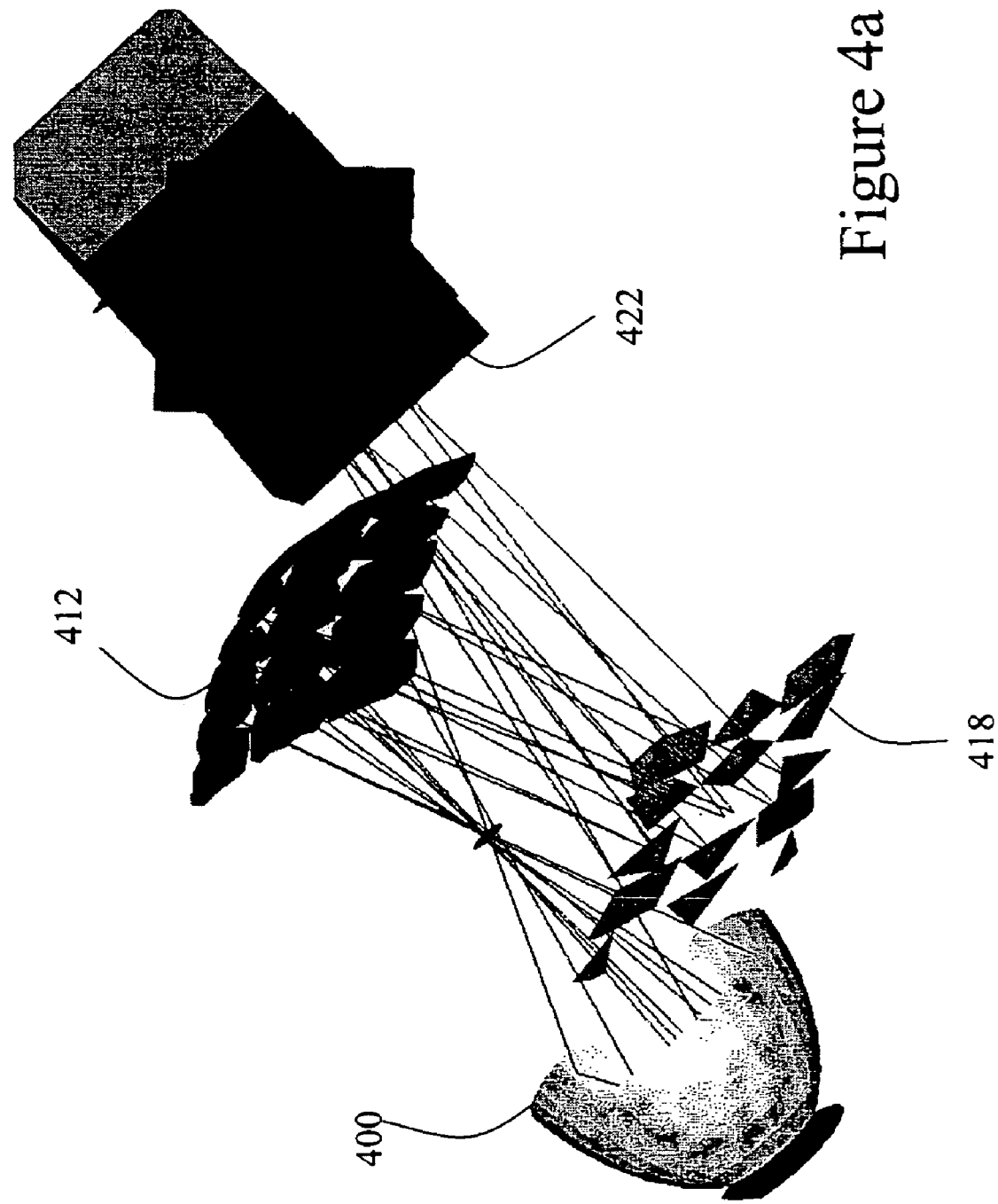
FIG. 4a is a 3-dimensional view of the system shown in FIGS. 2 and 3.
Figure 4B:
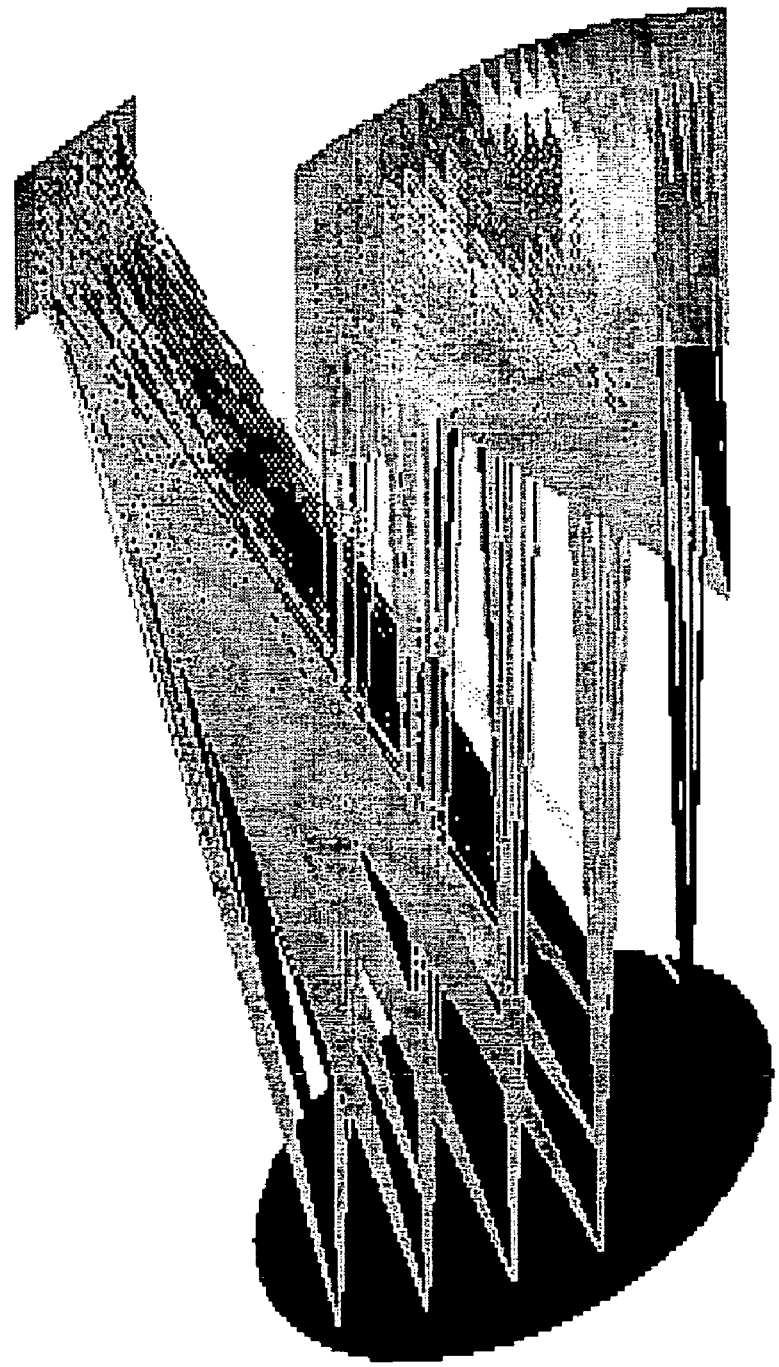
FIG. 4b is a alternate 3-dimensional view of the system in accordance with this invention.

A three dimensional view of the imaging system in accordance with the invention is shown in FIG. 4*a*. A light source, having a parabolic reflector 400, focuses light from the lamp within, at a location between the parabolic reflector 400 and the first array 412 of reflecting facets. The reflector 400 focuses the beam which afterwards becomes highly divergent as it propagates toward the first array 412 which is placed at a distance where all of the light will be captured. The overall curvature of the combined array of facets 412 substantially collimates this divergent light and reflects it as a collimated beam, formed of smaller sub-beams having characteristics dependent upon the shape and size of the individual facets. Although the larger beam directed from the first array to the second array is substantially collimated, the individual sub-beams converge upon the second array 418. The second array 418 of reflective lenses embodied as curved reflective facets is designed such that received light is reflected onto a same rectangular target plane 422 with substantially equal intensity across it.

The facets in each of the arrays are typically between 10 and 150 in number; however in a preferred exemplary embodiment and arrays of 6×8 elements were used wherein the dimension of each facet was 12.67 mm×8 mm having a ratio of 1.58. Dimensions of collection regions or pixels at the imager were 17.73 and 11.2 having a ratio of 1.58. The ratio of the facet to imager pixel was 1.4.

Figure 5:
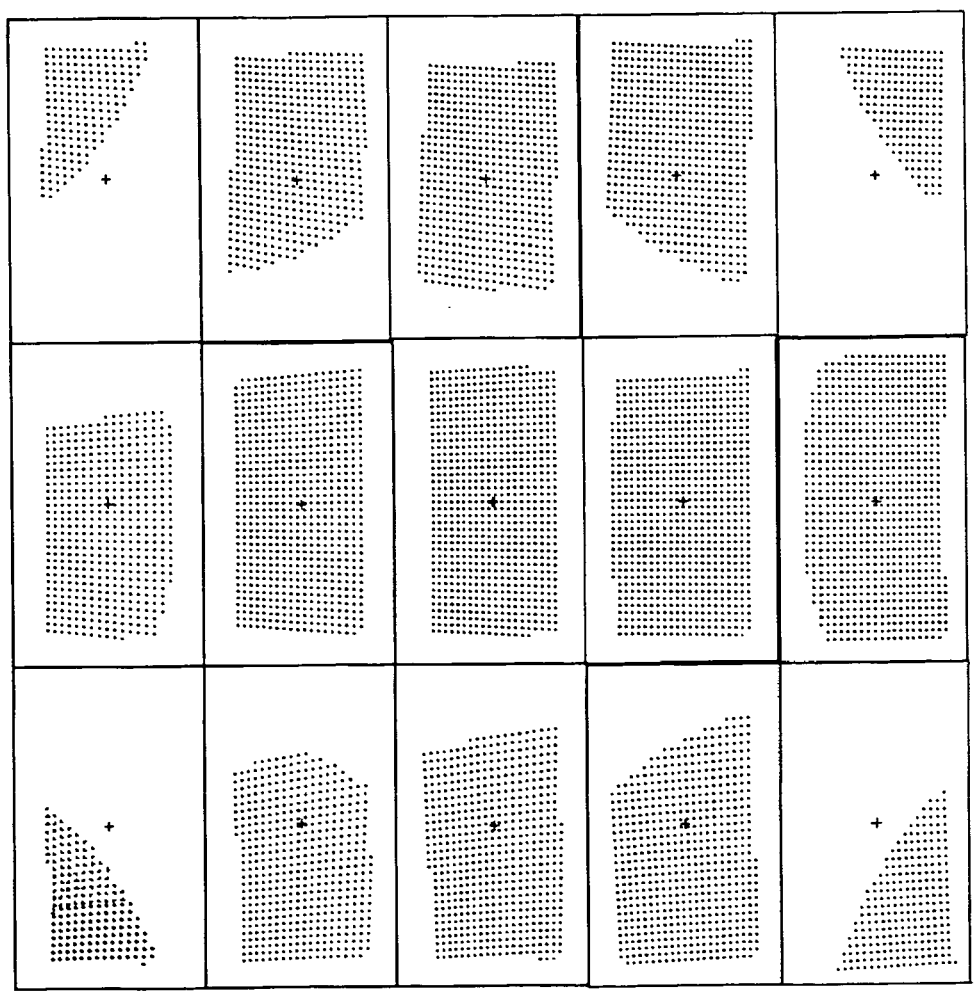
FIG. 5 is diagram illustrating the intensity pattern shown as 15 separate images corresponding to light on each of 15 facets of an array of mirrors of the illumination system.

FIG. 5 is a graphical illustration corresponding to the intensity contribution of each reflector array element of the 3×5 element array 412 as it maps onto the entire target plane. Although FIG. 5 appears as a 3×5 array of elements, this format is only used to depict the analysis of 15 instances of the entire image plane or target plane wherein each instance or rectangle in FIG. 5 represents the contribution from a different single reflective array element in the first array 412. By way of example, the top left corner element in FIG. 5 represents the contribution from a single reflector in the array 112 across the entire image plane. The next adjacent element in FIG. 5 to the right of the left most element represents the contribution across the entire image plane from a different reflector in the 3×5 array 412 of elements as shown in FIG. 4*a*. Therefore, in order to consider all of the light present on the image plane at an instance in time, that is the contribution of every facet of the array 412 onto the image plane, one would have to combine the distributions shown on all of the 15 representations of FIG. 5, as if they were stacked one on top of the other. Conveniently the symmetry in the illustration of FIG. 5, yields a substantially homogeneous intensity across the image plane when all of the 15 representations are stacked. The four instances represented by the four corners of the representation in FIG. 5 when mapped over each other yield a substantially uniformly illuminated image plane. To more fully understand the FIG. 5, the intensity contribution from all of the 15 rectangles should map onto a same single one of the 15 rectangles in an additive manner.

Figure 6:
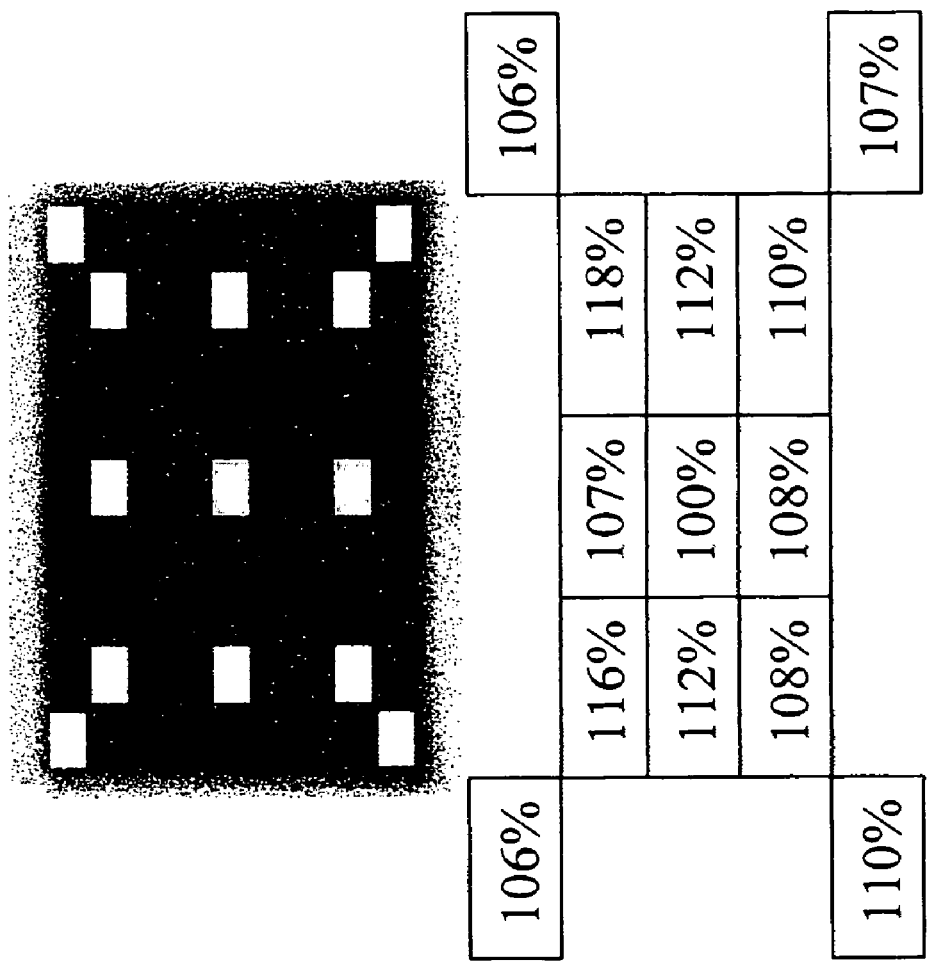
FIG. 6 is a diagram illustrating the illumination uniformity at the image plane.

FIG. 6 is a diagram illustrating the illumination uniformity at a target plane for selected locations across it. As can be noted the uniformity exceeds a 96% ANSI standard and indicates superb illumination in the corners of 106% using a reflector facet of 12.67 mm×8 mm with a ratio of 1.58 with collection regions or pixels at the imager of 17.73 and 11.2 having a ratio of 1.58.

In the preferred embodiment of the invention, as is shown in FIG. 4*a* a light source and two suitably sized and spaced parabolic reflector arrays facing on another provide a convenient and inexpensive folded architecture which obviates the complex lensing arrangements shown in the aforementioned prior art.

It is also believed that the reflector array 112 having dished reflective facts or elements arranged in a dish-like configuration is novel and is useful in other configurations for light mixing.

For example, in instances where a full folded configuration is not required, that is, in instances where having a second reflective array to collect and reflect light from the first array is not required, the first array 112 may still provide some advantages. In this manner a less preferred hybrid device can be considered, combining the first array 112 with lenslet arrays or with Watanabe's transmissive element as is shown in the prior art or with van den Brant's lens and transmissive array as is shown in FIG. 8. Depending on requirements, this provides advantages over the prior art. In FIG. 8 a planar array of reflectors 82 and a lens 84 serve to steer the beams received from the first array 112.

In even a less preferred embodiment, a two reflective arrays of flat mirrors can be utilized, with lenses, offering a folded, shorter device than is taught in the prior art. This embodiment is illustrated in FIG. 7 wherein an input beam is substantially collimated by a lens 700. An array of planar mirrors 742 receives the collimated light and reflects the light to a second array of mirrors 744. A second lens 746 focuses the light received from the second array of mirrors 744 and directs the mixed light more homogenously to the target location 748. Although this embodiment provides a compact folded light diffuser, it is more complicated and costly to manufacture than the one shown in FIG. 2 which does not require separate lenses.

Of course numerous other embodiments may be envisaged without departing from the spirit and scope of the invention. For example, FIG. 9 illustrates an embodiment of the invention wherein the light source 90 is disposed behind one of two arrays 92, facing array 94. This embodiment is substantially functionally equivalent to the embodiment of FIG. 2.

Figure 10:
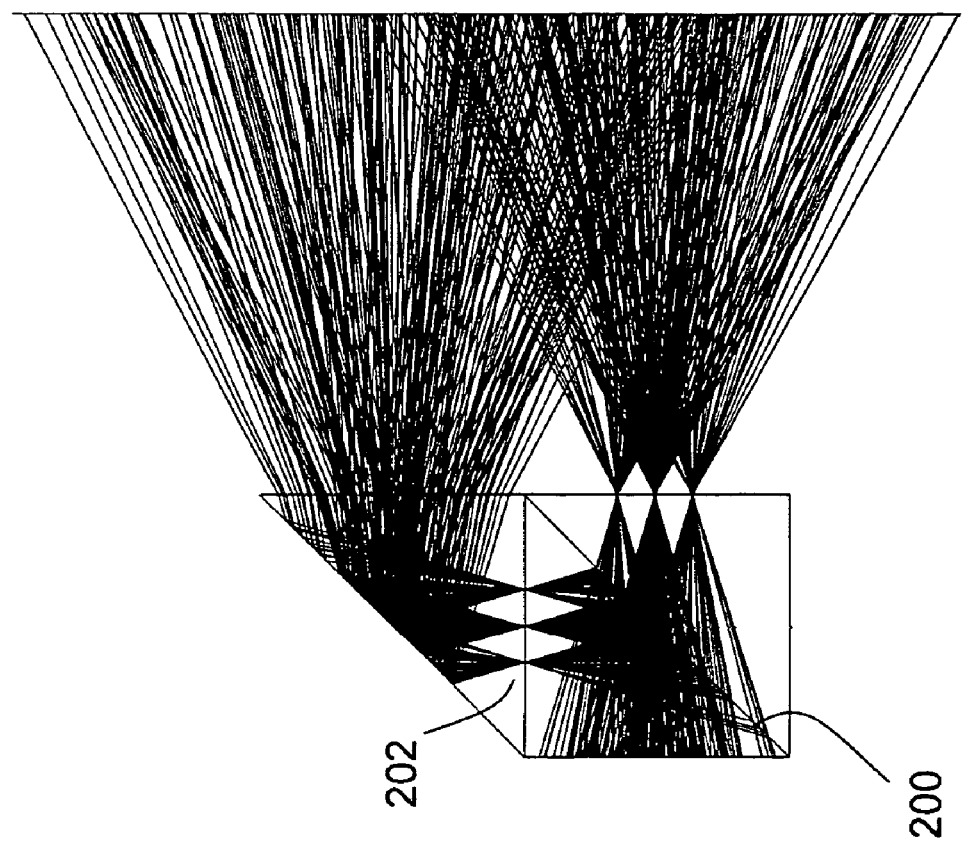
FIG. 10 is a diagram illustrating a polarization diversity unit for providing a single polarization.

FIG. 10 shows a unit for ensuring that incoming light is converted to a same polarization state. Preferably this is used at an input stage between the light source and the first array of reflectors 112. A polarization beam splitter (PBS) 200 with a retarder 202 in the form of a waveplate or rotator provides this functionality.

What is claimed is:

1. An optical illumination system for mixing light and providing mixed light to a target location comprising:
    a multi-wavelength light source; and
    a first concave reflective optical element having a curved light receiving face having a first concave dish-like curvature, disposed to receive light from the light source, wherein the first concave reflective optical element is formed from an array of smaller side-by-side concave curved reflective dish-like elements disposed in a dish-like configuration following the first concave curvature and having their centers lying along the first concave dish-like curvature such that the first concave reflective optical element serves to focus or collimate light incident thereon received from the radiation source, wherein the two dimensional array of smaller concave reflective optical elements are arranged to direct sub-beams from the light incident thereon received from the radiation source toward the target location, wherein at least one of the smaller concave curved reflective dish-like elements are in a side-by-side relationship with at least three other of the smaller concave curved reflective dish-like elements.

2. The optical illumination system for mixing light as defined in claim 1, wherein the concavity of each of the smaller concave reflective optical elements is substantially greater than the concavity of the curved light receiving face of the first reflective concave reflective optical element, such that the radius of curvature of each of the smaller concave reflective optical elements is smaller than the radius of curvature of the first concave reflective optical element.

3. The optical illumination system as defined in claim 2, further comprising a reflective means for receiving the sub-beams and reflecting the sub-beams towards the target so that they overlap to form a single beam at the target location.

4. The optical illumination system as defined in claim 3, further comprising a reflector disposed between the reflective means and the target location for directing the sub-beams onto the target location in an overlapping manner.

5. The optical illumination system as defined in claim 2, further comprising a second concave reflective optical element disposed to receive light from the light source via the first reflective concave reflective optical element, wherein the second concave reflective optical element is formed from a two dimensional array of smaller concave reflective optical elements disposed in a dish-like configuration such that the second concave reflective optical element serves to focus-or collimate light incident thereon received from the first reflective concave reflective optical element onto the target location.

6. The optical illumination system for mixing light as defined in claim 5, wherein the concavity of each of the smaller concave reflective optical elements is substantially greater than the concavity of the second concave reflective optical element, such that the radius of curvature of each of the smaller concave reflective optical elements is smaller than the radius of curvature of the second concave reflective optical element.

7. An optical illumination system for mixing light received from a lamp and for providing mixed light to a target location, comprising:
a first array of curved reflectors forming a dish-like reflector for receiving divergent incident light and for reflecting and focusing the received light as a plurality of focused sub-beams; and
reflective means optically coupled with the first array of curved reflectors, wherein one of the first array and the reflective means receive light from the light source and provide the light to the other of the reflective means and the first array via reflection for providing light in the form of overlapping sub-beams to the target location.

8. The optical illumination system as defined in claim 7, wherein the first array is configured to receive a single beam from the light source and to provide plural separate beams to the reflective means.

9. The optical illumination system as defined in claim 8, wherein the reflective means is a parabolic reflector.

10. The optical illumination system as defined in claim 9, wherein the parabolic reflector is comprised of a plurality of reflective facets configured to direct substantially all light incident thereon, received from the first array, to substantially homogeneously cover a same rectangular target.

11. The optical illumination system as defined in claim 9, further comprising polarization diversity means for converting the incoming light to polarized light.

12. The optical illumination system as defined in claim 10, wherein the first array has n curved reflectors and wherein the parabolic reflector has at least n reflective facets, wherein each of the n curved reflectors is configured to direct substantially most light incident thereon onto a different one of the n reflective facets.

13. The optical illumination system as defined in claim 12, wherein n>20.

14. The optical illumination system as defined in claim 13, wherein the intensity uniformity is greater in corner regions of the target location than in a centre region of a same area about the centre of the target location.

15. The optical illumination system as defined in claim 7, wherein the first array forms a parabolic reflector having a different base radius than the parabolic reflector formed by the reflective means.

16. A folded optical illumination system for mixing light and for providing mixed light to a target location, comprising:
a lamp for providing light to be mixed;
a first dished array of curved reflecting facets for receiving divergent incident light and for reflecting and focusing the received light as a plurality of converging sub-beams;
a second dished array of curved reflecting facets optically coupled with the first array of curved reflecting facets disposed to receive the converging sub-beams, and for reflecting received light such that each of the plurality of converging beams incident on the second dished array is reflected to substantially cover at least a portion of a same rectangular target region at the target location.

17. The optical illumination system for mixing light as defined in claim 16, wherein the reflective facets of the second dished array and the curved reflectors of the first array of have their centers disposed along a parabola.

18. An optical illumination system as defined in claim 1, wherein a plurality of the side-by-side concave curved reflective dishlike elements are a same size or a same shape, and wherein the dish-like elements form a closed dish.

* * * * *